United States Patent
Al-Qasim et al.

(10) Patent No.: US 12,140,008 B1
(45) Date of Patent: Nov. 12, 2024

(54) LOW CARBON STIMULATION TECHNOLOGY (STEAM-CO$_2$)

(71) Applicant: SAUDI ARABIAN OIL COMPANY, Dhahran (SA)

(72) Inventors: Abdulaziz S. Al-Qasim, Dammam (SA); Yuguo Wang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/326,898

(22) Filed: May 31, 2023

(51) Int. Cl.
| | |
|---|---|
| *E21B 43/16* | (2006.01) |
| *C01B 3/48* | (2006.01) |
| *C01B 3/50* | (2006.01) |
| *C09K 8/592* | (2006.01) |
| *C09K 8/594* | (2006.01) |
| *C09K 8/92* | (2006.01) |
| *E21B 43/24* | (2006.01) |

(52) U.S. Cl.
CPC ........... *E21B 43/24* (2013.01); *C01B 3/48* (2013.01); *C01B 3/501* (2013.01); *C09K 8/92* (2013.01); *E21B 43/164* (2013.01); *C01B 2203/0255* (2013.01); *C01B 2203/0283* (2013.01); *C01B 2203/0405* (2013.01)

(58) Field of Classification Search
CPC ....... E21B 43/164; E21B 43/24; C09K 8/592; C09K 8/594; C09K 8/92; C01B 3/48; C01B 3/501; C01B 2203/0255; C01B 2203/0283; C01B 2203/0405
See application file for complete search history.

(56) References Cited

U.S. PATENT DOCUMENTS

| | | | | |
|---|---|---|---|---|
| 4,982,786 | A | * | 1/1991 | Jennings, Jr. ........... E21B 43/24 166/402 |
| 6,227,293 | B1 | | 5/2001 | Huffman et al. |
| 2016/0084054 | A1 | * | 3/2016 | Vandigriff ........... E21B 43/2605 166/250.1 |

FOREIGN PATENT DOCUMENTS

KR 20130128228 A 11/2013

OTHER PUBLICATIONS

Nasr, T. N. et al. "Steam-CO2 Recovery Processes for Bottom Water Oil Reservoirs" Journal of Canadian Petroleum Technology Sep. 1995 vol. 34, No. 7, pp. 42-49 (9 pages).

(Continued)

*Primary Examiner* — Matthew R Buck
(74) *Attorney, Agent, or Firm* — Osha Bergman Watanabe & Burton LLP (57) ABSTRACT

A method for stimulating a reservoir includes providing a well traversing a subsurface into a reservoir containing hydrocarbons. Carbon dioxide and steam may be introduced into the reservoir via the well. The reservoir may be stimulated using one or more of infrasonic, acoustic, and ultrasonic stimulation. Seismic analyses may be applied to determine changes in flow characteristics of the reservoir. Monitoring a flow back effluent via one or more sensors located in the well may determine one or more properties of the flow back effluent. The introduction of carbon dioxide and steam, stimulating, and applying seismic may be repeated until a desired property of the flow back effluent is achieved. The method may include introducing hot carbonated water, carbon dioxide, and cold carbonated water into the reservoir via the well.

16 Claims, 3 Drawing Sheets

(56) References Cited

OTHER PUBLICATIONS

Song, Xuehang et al. "Fracturing with carbon dioxide: from microscopic mechanism to reservoir application." Joule 3.8 (2019): 1913-1926 (15 pages).

Surguchev, Leonid M. "Air injection to improve oil recovery from mature light oil field." International Research Institute of Stavanger http://www.ccop.or.th/eppm/projects/16/docs/Surguchev2%20Air%20Injectio 20ENG (2009): 202009. (29 pages).

"Hydraulic fracturing—What it is" <https://earthworks.org/issues/hydraulic-fracturing-101/> (16 pages).

Xu, Zhengxiao et al. "Investigation of the Heat Transfer Mechanism of CO2-Assisted Steam Injection via Experimental and Simulation Evaluation." Frontiers in Energy Research 8 (2020): 592142 (30 pages).

Mohammed Abdalraheem et al., "The Effects of Combination of Steam Flooding, CO2 and Cyclic Steam Stimulation Injection Pilot Test in Heavy Oilfield in Sudan", Scientific Contributions Oil & Gas, vol. 45, No. 3, Dec. 2022, pp. 127-142 (16 pages).

International Search Report and Written Opinion issued in corresponding International Application No. PCT/US2024/031116, dated Sep. 3, 2024 (15 pages).

* cited by examiner

LOW CARBON STIMULATION TECHNOLOGY (STEAM-$CO_2$)

FIELD OF THE DISCLOSURE

Embodiments of the present disclosure generally relate to well stimulation and enhanced hydrocarbon recovery.

BACKGROUND

Wellbore stimulation is a branch of petroleum engineering focused on ways to enhance injectivity into a formation or to enhance the flow of hydrocarbons from a formation. To produce hydrocarbons from the targeted formation, the hydrocarbons in the formation need to flow from the formation to a wellbore then to the surface. The flow into or from the formation to the wellbore may depend on formation permeability. When formation permeability is low, stimulation is applied to enhance the flow. Stimulation can be applied in the wellbore and into the formation to build a network in the formation.

$CO_2$-based stimulation or $CO_2$-assisted stimulation techniques are utilized in hydrocarbons reservoirs as alternative means to conventional stimulation techniques that use extensive amounts of water associated with power usage and carbon emissions. This low-carbon method has already exhibited proven and tremendous benefits, related to productivity enhancement, reduced flowback period, efficient cleanup, cost avoidance and carbon reuse/storage potentials. In addition, the method significantly reduces the amount of water needed when applying hydraulic fracturing treatments.

For example, $CO_2$ replaces part of the water used to mix frac fluids, reducing ground water usage. Further, $CO_2$ has high miscibility in condensate, and thus helps in stripping more condensate from the reservoir, especially near the wellbore. $CO_2$ is also very likely to eliminate the need for $N_2$ lifting for the majority of wells that are stimulated or fracked in depleted areas. Additionally, as $CO_2$ heats up within the reservoir and is converted from liquid to gas phase, it is expected to cause an immense reduction of flowback time and therefore, result in reducing the required expenditure.

Such stimulation techniques can be applied through various types of well completions, including vertical cased and cemented, and open-hole multi-stage-fracturing completions, with the water and acid volume being reduced significantly. The post-stimulation flowback period is also expected to be reduced eliminating the need for coiled tubing based lifting technologies to revive the well. However, one major disadvantage is that most of the $CO_2$ injected will return to surface during flowback operations and may end up being vented. Surface capture of the returned $CO_2$ may be expensive, especially in remote areas.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for stimulating a reservoir. The method includes providing a well traversing a subsurface into a reservoir containing hydrocarbons. Carbon dioxide and steam are introduced into the reservoir via the well, and the reservoir is stimulated using one or more of infrasonic, acoustic, and ultrasonic stimulation. Seismic analyses are used to determine changes in flow characteristics of the reservoir, monitoring a flow back effluent via one or more sensors located in the well to determine one or more properties of the flow back effluent. The method also includes repeating introducing the carbon dioxide and steam, stimulating, and applying seismic until a desired property of the flow back effluent is achieved.

In another aspect, embodiments disclosed herein relate to another method for stimulating a reservoir. The method includes providing a well traversing a subsurface into a reservoir containing hydrocarbons. Hot carbonated water, carbon dioxide, and cold carbonated water are introduced into the reservoir via the well, and the reservoir is stimulated using one or more of infrasonic, acoustic, and ultrasonic stimulation. Seismic analyses are used to determine changes in flow characteristics of the reservoir, monitoring a flow back effluent via one or more sensors located in the well to determine one or more properties of the flow back effluent. The method also includes repeating sequentially introducing carbon dioxide and steam, stimulating, and applying seismic until a desired property of the flow back effluent is achieved.

Other aspects and advantages of the claimed subject matter will be apparent from the following description and the appended claims.

DETAILED DESCRIPTION

In one aspect, embodiments disclosed herein relate to well stimulation and improved oil recovery. In another aspect, embodiments herein are directed toward methods for stimulating a reservoir and delivering stimulation fluids to a reservoir to improve recovery of fluids from the reservoir.

Wellbore or reservoir stimulation may be performed according to embodiments herein by introducing steam, carbon dioxide, and/or carbonated water into the reservoir. The introduction of steam and carbon dioxide, or steam, carbon dioxide, and carbonated water may be performed sequentially, in any order.

For example, in some embodiments, reservoir stimulation includes injecting steam into the target formation followed by injection of carbon dioxide into the formation. Alternatively, in other embodiments, reservoir stimulation includes injecting carbon dioxide into the target formation followed by injection of steam into the formation.

In other embodiments, for example, reservoir stimulation includes injecting carbon dioxide into the target formation followed by injection of carbonated water then injection of steam. In yet other embodiments, the injection order of the three injection types may be swapped, such as by injecting carbonated water first, second or third, injecting steam first, second, or third, and injecting carbon dioxide first, second or third, as the case may be. In other embodiments, the steam and carbon dioxide may be co-injected followed by or preceded by carbonated water injection.

In still further embodiments, reservoir stimulation includes sequential injection of carbonated water and carbon dioxide, in any order. Embodiments may further include injection of one or both hot and cold carbonated water into the target formation.

During or following the introduction of the stimulation fluids, the near wellbore area is stimulated by one or more of infrasonic, acoustic, ultrasonic, or microwave stimulation. Such stimulation may promote movement of fluids, reactions, contact efficiency, and other aspects of the fluid-reservoir interaction in the near wellbore area.

The stimulation fluid sequence may be repeated, if desired, such as two, three, four, or more sequences. Downhole sensors may be used to periodically or continuously assess the performance and results of the stimulation and fluid injections. Additionally, seismic data may be recorded during or following the stimulation sequence to determine the effect of the stimulation fluid sequence on fluid flow behavior within the reservoir. When a desired improvement in flow back or fluid movement within the reservoir is achieved, the stimulation process is concluded and production of oil, hydrogen, natural gas, and other valuable resources from the reservoir may continue.

As outlined above, embodiments herein provide for stimulation techniques based on sequential $CO_2$ injection with steam injection or alternating $CO_2$ injection with carbonated water followed by steam injection. The embodiments herein may reduce the amount of carbon dioxide used in fracking or stimulation operations and may thus significantly decrease the amount of carbon dioxide flowing back during the post-stimulation operations.

Embodiments herein include different configurations for this purpose and include the introduction of stimulation technologies (infrasonic waves, acoustic waves, ultrasonic waves, and/or microwaves) to enhance the stimulation operations. Embodiments herein may also include air injection, catalysts, and use of a retrievable downhole membrane for high concentration hydrogen generation. Air injection may be used for partial oxidation of hydrocarbons to produce carbon monoxide and hydrogen gas. Catalysts may be used to further produce hydrogen gas. The retrievable downhole membrane may be used to separate the mixture of carbon dioxide and hydrogen gas that may be present downhole. Also, gelling agents may be used for deeper diversion of carbon dioxide to lower zones and to mitigate gravity override. These and other aspects of reservoir stimulation techniques according to embodiments herein are described in more detail below.

Carbon Dioxide

In one or more embodiments, a method of enhancing the productivity, injectivity, or sweep efficiency of a subterranean wellbore includes introducing carbon dioxide to the target zone of the wellbore. The carbon dioxide may be introduced into the formation as a supercritical fluid, a subcritical fluid, a liquid, or a gas, in various embodiments. As used throughout this disclosure, "supercritical" refers to a substance at a pressure and a temperature greater than those of the substance's critical point, such that distinct phases do not exist and the substance may exhibit the diffusion of a gas while dissolving materials like a liquid. Similarly, "subcritical" refers to a substance with a pressure and a temperature of less than those of the substance's critical point, such that distinct phases exist. In some embodiments, the $CO_2$-based fluid is supercritical $CO_2$. In some embodiments, the $CO_2$-based fluid is liquid $CO_2$. In some embodiments, the $CO_2$-based fluid has a purity in the range of greater than 95%, such as greater than 98%, such as greater than 99%, such as greater than 99.9%.

In some embodiments, other components of the $CO_2$-based fluid may comprise air. The air may comprise atmospheric air, air having dilute oxygen, or oxygen-enriched air. The amount and type of air may depend upon the wellbore, wellbore conditions, and type of hydrocarbons in or near the wellbore, among other factors.

Steam

In one or more embodiments, a method of enhancing the productivity, injectivity, or sweep efficiency of a subterranean wellbore includes introducing steam to the target zone of the wellbore. In some embodiments, steam may be generated at a surface location and then injected into the wellbore and thence into the reservoir. Surface facilities to generate steam may include boilers, solar steam generators, concentrated solar plants, molten salt exchangers, or other heat exchange media and devices known in the art to convert water to steam at the required temperatures and pressures to be used for stimulation of the target formation.

Other embodiments of the disclosure include systems and methods for stimulating a reservoir using a downhole steam generating apparatus, such as an apparatus using combustion, laser, or other forms of energy, within a wellbore to increase a temperature of a water stream prior to injection of the in situ generated steam into one or more target zones in a geological region. When injected from a surface steam generation system, steam quality available for injection may decrease with increasing wellbore length. Accordingly, some embodiments increase energy efficiency of a well stimulation process by disposing one or more steam generating apparatuses near one or more target zones. For example, a steam generating apparatus may be a device that is lowered in a wellbore, e.g., using a cable conveyance system, that subsequently produces steam. From a continuous water supply, the steam generating apparatus may provide continuous steam to the target zones in the wellbore to increase fluid flow and production. In some embodiments, the steam has a purity in the range of greater than 95%, such as greater than 98%, such as greater than 99%, such as greater than 99.9%. In some embodiments, other components of the steam may comprise air.

Carbonated Water

In one or more embodiments, a method of enhancing the productivity, injectivity, or sweep efficiency of a subterranean wellbore includes introducing a carbonated mixture comprising water and carbonate anions to the target zone of the wellbore.

In some embodiments, the carbonated mixture is produced by dissolving carbon dioxide into an aqueous fluid. In one or more embodiments, the aqueous fluid is a water-based fluid. The water-based fluid may be distilled water, brine, deionized water, tap water, fresh water from surface or subsurface sources, formation water produced from the structural low, formation water produced from a different geologic formation, production water, frac or flowback water, natural and synthetic brines, residual brine from desalination processing, a regional water source, such as fresh water, brackish water, natural and synthetic sea water, potable water, non-potable water, ground water, seawater, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the release of $CO_2$ from the carbonated fluid, a desired reaction within the reservoir, or both. In one or more embodiments, the water-based fluid includes additives such as viscosifiers, polymers, surfactants, and combinations thereof.

The water-based fluids of one or more embodiments may include other additives provided the additives do not interfere with the release of $CO_2$ from the carbonated water. Such additives may include, for instance, one or more wetting agents, corrosion inhibitors, biocides, surfactants, dispersants, interfacial tension reducers, mutual solvents, and thinning agents. The identities and use of the aforementioned additives are not particularly limited. One of ordinary skill in the art will, with the benefit of this disclosure, appreciate that the inclusion of a particular additive will depend upon the stage of reservoir operations, desired application, and properties of a given wellbore fluid.

Dissolution of carbon dioxide in water results in the formation of ions including hydrogen cations ($H^+$) and carbonate anions ($CO_3^{2-}$). Water in the carbonated mixture may be fresh water or saltwater and may be obtained from natural sources or artificially produced. In one or more embodiments, the carbonated mixture may be any fluid that contains water and carbonate anions obtained by dissolving carbon dioxide into the water and is suitable for being introduced to the wellbore.

In one or more embodiments, the carbonated mixture may be carbonated water produced by dissolving carbon dioxide into water to produce carbonated water, and the carbonated water may be introduced directly into the wellbore. In other embodiments, the carbonated mixture is an injection fluid into which the carbonated water is mixed before or as being introduced into the wellbore. In yet other embodiments, the carbonated mixture is an injection fluid to which carbon dioxide is directly dissolved in before or as being introduced to the wellbore.

In one or more embodiments, the carbonated mixture includes $CO_2$ dissolved in a sufficient amount of an aqueous fluid such that the gas is completely dissolved and maintains the form of a carbonated fluid at the depth of the release into the target formation. The $CO_2$ may be dissolved in a sufficient amount to maximize a formation sweep efficiency via maximization of $CO_2$ release from the carbonated fluid. In one or more embodiments, the amount of $CO_2$ dissolved in the aqueous fluid may be dependent upon a composition of the aqueous fluid, a temperature and/or pressure of the formation, and a temperature and pressure of the fluid as it is being injected, among other factors.

In some embodiments, the carbonated mixture is introduced to the target zone as a "hot" carbonated fluid. In other embodiments, the carbonated mixture is introduced to the target zone as a "cold" carbonated fluid. The terms "hot" and "cold" define the temperature of the carbonated fluid being injected based upon the temperature differential between the reservoir and the fluid being injected.

In one or more embodiments, the carbonated mixture is acidic and has a pH of about 2.0 to 6.9. In some embodiments, the carbonated mixture may have a pH in a range from a lower limit selected from any of 2.0, 2.5, 3.0, 3.5 and 4.0 to an upper limit selected from any of 4.0, 4.5, 5.0, 5.5, 6.0, 6.5 and 6.9, where any lower limit may be used in combination with any upper limit.

Hot carbonated water or fluids are those that have a temperature greater than a temperature of the formation into which they are being injected. The temperature of "hot" carbonated fluids injected into a reservoir may be in a range from 10° C. to about 200° C. above the reservoir temperature, such as from a lower limit of about 10° C., 15° C., 20° C., 25° C., 30° C., 35° C., 40° C., 45° C., or 50° C. above the reservoir temperature, to an upper limit of about 155° C., 160° C., 165° C., 170° C., 175° C., 180° C., 185° C., 190° C., 195° C., or 200° C. above the reservoir temperature. As noted above, it is desired to maintain the hot carbonated fluids as a liquid during injection into the reservoir, and thus an upper limit for injection temperature of the carbonated fluids may depend upon the pressure of the specific reservoir.

Cold carbonated water or fluids are those that have a temperature less than a temperature of the formation into which they are being injected. The temperature of "cold" carbonated fluids injected into a reservoir may be in a range from 10° C. to about 200° C. below the reservoir temperature, such as from a lower limit of about 10° C., 15° C., 20° C., 25° C., 30° C. 35° C., 40° C., 45° C., or 50° C. less than the reservoir temperature, to an upper limit of about 155° C. 160° C. 165° C., 170° C., 175° C., 180° C. 185° C. 190° C., 195° C., or 200° C. less than the reservoir temperature. As noted above, it is desired to maintain the cold carbonated fluids as a liquid during injection into the reservoir, and thus an upper limit for injection temperature of the carbonated fluids may depend upon the pressure of the specific reservoir. The lower limit of the temperature may, of course, also be limited based on a freeze point of the carbonated mixture.

Wave Stimulation

In one or more embodiments, the method of enhancing the productivity, injectivity, or sweep efficiency of a subterranean wellbore includes providing stimulus to the injected fluids, such as the carbonated mixture. Stimulus in the present disclosure may include, but is not limited to, a form of energy such as sound energy and motion energy. In some embodiments, the stimulus may promote reaction of divalent cations with carbonate anions, among other reactions that may promote productivity from the reservoir.

In some embodiments, the stimulus is provided as an energy form including infrasonic, acoustic, ultrasonic waves, and microwaves. The stimulus may provide additional agitation to the carbonated mixture to promote the mixing and contacting of ions with the formation, contacting of divalent cations with carbonate anions, and migration of $H^+$ ions into the cavities of the formation.

In one or more embodiments, the stimulus is provided by a stimulus generator, such as an acoustic wave generator, infrasonic wave generator, ultrasonic wave generator, or microwave generator. Such generator may be incorporated into any suitable portion of the wellbore and may be located within such portion via wireline placement, for example. The stimulus may be provided continuously or intermittently. There is no limitation on the duration and timing of the stimulation process and the strength of the provided stimulus, and they may be adjusted and optimized based on the specific conditions of the reservoir stimulation process. The stimulus generator can be placed permanently downhole or can be retrievable and used during the treatment operation.

In one or more embodiments, for example, a stimulus generator includes an acoustic unit that is configured to transmit an audio signal into the formation. The reaction between carbonic acid formed in the treatment fluid and the reactive portions of the formation may be accelerated or stimulated when influenced by acoustic energy transmitted into the formation. The acoustic waves traversing the formation stimulates motion in not only the matrix material but also in the fluids, such as the aqueous solution and the carbon dioxide, and any free solids present in the formation or provided with the carbonated water, such as basalt nanoparticles. The energy conveyed into the formation helps to accelerate the carbonate formation reaction and to keep carbon dioxide dissolved in the aqueous solution, where it may convert into carbonic acid and react. Variables, such as the formation material, porosity, thickness of formation, the concentration of carbon dioxide and other factors may affect the frequency utilized to stimulate the reaction in the formation. The frequency, power, and the periods of transmission may be controlled utilizing a coupled control signal line or by other means as known in the art for communicating with the device.

The audio frequency that is utilized in stimulating the reaction in the formation may vary. In one or more embodiments, the frequency of transmission from the acoustic unit may be in an ultrasonic frequency range. Ultrasonic frequency is appreciated to be in a range of from about 20 kHz (kilohertz) to several gigahertz. In one or more embodiments, the frequency of transmission from the acoustic unit may be in the sonic frequency range. The sonic frequency range, also known as the audible frequency range, is appreciated to be in a range of from about 20 Hz (Hertz) to about 20 kHz. In one or more embodiments, the frequency of transmission from the acoustic unit may be in the infrasonic frequency range. Infrasonic frequencies are appreciated to be in a range of from about 0.001 Hz to about 20 Hz.

In one or more embodiments, the transmission of waves is selected from continuous, periodic, or random pattern. In one or more embodiments, the transmission may be utilized to produce dissidence within the formation. In one or more embodiments, the transmission may be utilized to provide a harmonic within the formation.

As described above, in a method of treating a formation, in one or more embodiments the formation is stimulated. Acoustic or other waves noted herein may be transmitted into the formation such that the carbonation reaction is stimulated, and carbon dioxide (in the aqueous form of carbonic acid) is neutralized into sparingly soluble carbonates by reaction with the formation matrix material that is reactive with carbonic acid. In one or more embodiments, the acoustic signal may be selected from an ultrasonic, a sonic, or an infrasonic frequency. In one or more embodiments, other waves may be produced from a microwave emitter.

Seismic

Embodiments herein additionally apply seismic analyses of the reservoir to determine the progress of the stimulation processes being performed. For example, following stimulation, namely the sequential introduction of the chosen stimulus fluids and wave stimulation, seismic measurements and data may be collected, and a differential seismic velocity model may be used to assess changes in subterranean features and fluid motion within the inter-wellbore region of interest caused by the stimulus processes being conducted. The changes in subterranean features and fluid motion may be used to predict changes for later stimulation efforts. Further, the changes in subterranean features and fluid motion may be used to inform completion and/or recovery programs. Seismic analyses of the reservoir may require sensors. The sensors may be placed downhole by wireline. Seismic analyses may be online analyses. Stimulation may be stopped during seismic analyses.

Monitoring of Flow Back

In one or more embodiments, the method of enhancing the productivity, injectivity, and sweep efficiency of a subterranean wellbore includes monitoring the reaction process of divalent cations and carbonate anions and the depositing process of the carbonate mineral. In some embodiments, the monitoring process includes obtaining information regarding the reaction rate of the divalent cations and carbonate anions, and the rate of carbonate mineral precipitation. Such information may be used to determine whether additional carbonated mixture and/or stimulus are required in order to maintain, accelerate and/or complete the treatment process.

In some embodiments, the monitoring includes collecting samples and manually conducting various tests to obtain necessary information to assess the reaction and productivity enhancement processes. In one or more embodiments, the monitoring may include collecting samples of the injection fluid and conducting tests to obtain properties such as the amount of carbonate mineral, divalent cations and carbonate anions in the injection fluid, and the pH of the injection fluid. In other embodiments, the monitoring may include measuring the amount of injection fluid introduced to the wellbore and the amount returning to assess the level of enhancement.

In other embodiments, the monitoring includes incorporating downhole sensors into the wellbore and obtaining properties such as the amount of carbonate anions in the fluid such as injection fluid and carbonated mixture, and the pH of the injection fluid. In some embodiments, the monitoring may include observing the reaction or precipitation process of carbonate mineral in the target zone by using sensors such as thermal and ultrasonic sensors. The monitoring may be continuous or intermittent.

In one or more embodiments, the monitoring provides information that may be used to adjust the amount of carbonated mixture to be introduced to the target zone, and the strength of the stimulus and the duration of the stimulus provision.

In a method of treating a formation, in one or more embodiments the formation is monitored. The formation and the progress of the carbonation reaction may be monitored as previously described, such as by initiating flowback into the treatment zone and detecting pH or carbon dioxide concentration levels in the fluid. The wellbore wall in fluid contact with the formation in the treatment zone may also be inspected utilizing known techniques for signs of corrosive damage, such as by carbonic acid matrix acidification, or deposition of carbonates at the face of the formation. Distributed acoustic sensing (DAS) and distributed temperature sensing (DTS) may be utilized to track the progress of the reaction. As well, chemical, radioactive, or physical (nanoparticle) tracers may be utilized to monitor the process. The tracers may be released and detected in a formation fluid flowback test.

In some embodiments, the method of enhancing the productivity, injectivity, or sweep efficiency of a subterranean wellbore may include, as an option, repeating the sequential introduction of the stimulus fluids, such as the carbon dioxide, steam, and/or carbonated fluid, as well as the stimulating (providing stimulus) and monitoring of the resulting dissolving or reaction of formation components due to contact with the stimulus fluids. In some embodiments, the repeating process may include all steps included in the method of enhancing the productivity, injectivity, and sweep efficiency of a subterranean wellbore. In other embodiments, selective steps of the method may be repeated. The number of repeats is not limited and may be repeated as many times as necessary until the productivity, injectivity, and sweep efficiency are enhanced. Each repeated process may be the same as the previous iteration, or may be different, and may be adjusted in accordance with a specific target for the productivity enhancement. Further, seismic monitoring of the changes in formation properties may be repeated as needed, which may be after two, three, or more repeats of the sequential introduction of the stimulus fluids.

In some embodiments, the method of enhancing the productivity, injectivity, or sweep efficiency of a subterranean wellbore may be conducted without stopping the production operation, or with a minimal disruption. A minimal disruption may include halting the production operation for a short period of time, such as 5 minutes, 10 minutes, 30 minutes, or 1 hour.

As described above, embodiments of the methods of enhancing the productivity, injectivity, or sweep efficiency of a subterranean wellbore may be conducted by incorporating one or more of a steam generating device, monitoring devices, injection devices, and stimulation devices. Such devices may be incorporated into any portion of the wellbore via any suitable means such as wireline placement, and the devices may be fixed in one location or may be mobile and transfer to any portion of the wellbore as necessary. In some embodiments, a plurality of devices may be used. In some embodiments, the devices may include a stimulus generator providing stimulus in mainly the radial direction of the control device. The control device may also include sensors, a retrieval/deployment line, and a motor. In some embodiments, the stimulus generator may include an acoustic wave generator, infrasonic wave generator, ultrasonic wave generator, or microwave generator.

In some embodiments, one or more of the devices may be a mobile device capable of transferring to any location along the wellbore. The movement of the mobile device(s) may be controlled mechanically by a retrieval/deployment line and a line retrieval/deployment means such as a reel or a winch.

In some embodiments, one or more of the devices may contain sensors which may include a camera, scanner, logging and scanning ring, hole caliper, or any other devices which may be used to measure or record various aspects of the downhole environment and the process of stimulating the formation target zone. In some embodiments, the monitoring of the target zone may be conducted by the sensors included in the device.

The method of enhancing the productivity, injectivity, and sweep efficiency of a subterranean wellbore described herein may be applied to a vertical wellbore or a horizontal wellbore. The current description may be applicable in any subterranean formation, especially hydrocarbon reservoirs. The formation may be primarily sandstone, primarily carbonate (either limestone or dolomite), shale, siltstones or coal. The formation fluid may be primarily water or primarily hydrocarbon (gas and/or condensate and/or oil). The stimulation may be needed because the formation inherently has too low a permeability or because it has been damaged. The wellbore may be substantially vertical, deviated, or partially horizontal, and may be open hole or cased, in which case it may be cemented. The reservoir may be overpressured or underpressured.

As described above, steam and carbon dioxide are introduced into a target formation of the reservoir sequentially, in either order, or may be co-injected according to embodiments herein. Steam and carbon dioxide may be injected at volume ratios in a range from 1 to 10, such as from 1 to 3.

In other embodiments, steam and carbonated water may be introduced to the reservoir at volume ratios in a range from 1 to 10, such as from 1 to 3.

In further embodiments, carbon dioxide and carbonated water may be introduced to the reservoir at volume ratios in a range from 1 to 5, such as from 1 to 3.

As described above, embodiments herein may inject carbon dioxide, steam, or carbonated water into the reservoir. Further, embodiments herein may utilize stimulation generators, various sensors, steam generators, seismic analyzers, and other equipment within the wellbore. Such equipment may be deployed via wireline, coiled tubing, or other means as known in the art to achieve the objective of each step of the stimulation processes disclosed herein.

Figure 1:
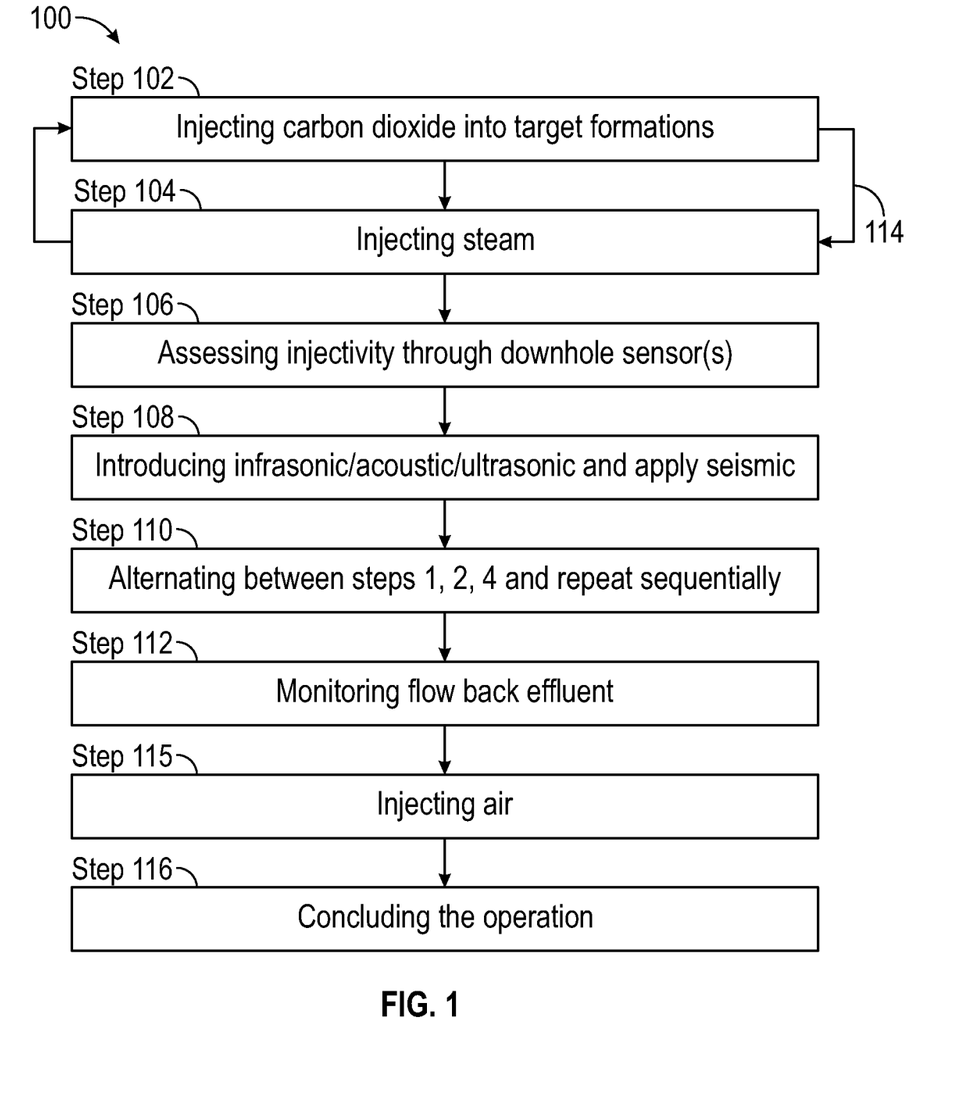
FIGS. 1-3 are flowcharts illustrating steps of methods for stimulating a reservoir according to embodiments herein.

Referring now to FIG. 1, a flowchart illustrating steps of method 100 for stimulating a reservoir according to embodiments herein is illustrated.

Stimulation method 100 includes a first step 102 injecting carbon dioxide into the target formation. As noted above, the carbon dioxide may be supercritical, subcritical, and may be gaseous, liquid, or supercritical. The carbon dioxide injection may be performed for a period of time, such as 30 minutes or one hour to five hours. Carbon dioxide may be injected, for example, at rates in a range from 100 kg/h to 1000 kg/h, although such ranges may vary depending upon the type and size of the target formation.

Following injection of carbon dioxide, method 100 includes step 104 injecting steam into the formation. Steam may be generated using a surface facility and injected downhole or may be generated in situ within the wellbore. The steam injection may be performed for a period of time, such as 30 minutes or one hour to five hours. Steam may be injected, for example, at rates in a range from 100 kg/h to 1000 kg/h, although such ranges may vary depending upon the type and size of the target formation.

In step 106, the method includes assessing the injectivity. Extent of completion of reactions and other properties of the reservoir or the injected or produced fluids may be measured with various downhole sensors, including thermal sensors, ultrasonic sensors, and others to assess the changes to the near wellbore area resulting from the sequential injection of carbon dioxide and steam. While listed as a "step" in the present flowchart, assessing the injectivity may be performed continuously during the extent of the stimulation process, concurrent with other steps of the method.

In step 108, the method includes stimulating the target formation by introducing infrasonic waves, acoustic waves, ultrasonic waves, or microwaves. As noted above, such stimulation may enhance transport within and/or reactivity of the injected fluids with the formation. Step 108 also includes applying seismic measurements and analyses to assess changes in formation flow characteristics. Stimulation may be performed, for example, for a period of time in a range from 30 minutes or 1 hour to 5 hours.

In step 110, the injection of carbon dioxide, steam, and stimulation may be repeated sequentially. For example, two, three, or four cycles of carbon dioxide injection, steam injection, and stimulation may be performed. The steps may be performed manually, such as over discrete time intervals, or may be automated, where the automated sequencing may be performed utilizing one or more sensors disposed within the wellbore, where the sequence steps may be automatically transitioned based upon reaction completion, reservoir temperature, or other factors.

Following completion of the sequential injection of carbon dioxide and steam, well flowback is initiated in step 112, and the flow back effluent is monitored. Monitoring of the flow back effluent may be performed via one or more manual or automated sensors disposed within the wellbore, and may monitor acidity, composition, temperature, rate, or other aspects of the flow back effluent. In other embodiments, monitoring of the flowback may be performed or measured at a surface location based upon produced fluids received at the surface.

Arrows 114, while not a true "step" in the process, simply provides a reminder that, as described above, the carbon dioxide and steam injection may be performed in any order. For example, step 102 may be followed by or preceded by step 104. Further, when alternating between steps 102, 104, and 108, a second or subsequent sequence of injections may swap the order of steam and carbon dioxide injection for that particular cycle.

When desired injectivity and flow back are achieved, step 115 of air injection may be performed. The air may be pressurized depending on the type of formation. According to one or more embodiments, high pressure air injection (HPAI) is injected into an formation. The pressurized air in HPAI contains oxygen that reacts with some of the hydrocarbons in the formation to produce carbon dioxide. HPAI may be useful to increase production for light oils instead of using light air injection (LAI). HPAI may be performed at pressures greater than 800 psig. The air may be gaseous and factors such as the gas flow rate, time of flowing gas, and amount of gas needed may depend on the environmental variables such as temperature and pressure, and fluid properties of the formation. The air injection may be 50% to 90% air by volume. The air may comprise atmospheric air, air having dilute oxygen, or oxygen-enriched air. According to one or more embodiments, heated air (hot air) is introduced into the formation. The temperature of the heated air may be in a range from 400° C. to 600° C.

There are mainly two reactions that produce hydrogen in the presence of hydrocarbons when air is injected. Namely, the partial oxidation reaction and the water gas shift reaction. The elevated temperature of the reservoir, that is, temperature greater than surface, is useful to carry out several reactions described herein. In the partial oxidation reaction, hydrocarbon ($C_nH_m$) reacts with oxygen ($O_2$) in the air and produces hydrogen ($H_2$), carbon monoxide (CO) and energy in the form of heat as shown in Equation 1 (Eq. 1). The complete combustion of crude oil may generate heat in the range of around 42-47 megajoules per kilogram (MJ/Kg). In the water gas shift reaction, the CO produced in the partial oxidation of hydrocarbons or found in the reservoir reacts with water ($H_2O$) to produce H2, carbon dioxide ($CO_2$), and heat energy as shown in Equation 2.

$$C_nH_m + nH_2O \rightarrow nCO + (n+0.5\,m)H_2 + \text{Energy} \quad \text{Equation 1}$$

$$CO + H_2O \rightarrow CO_2 + H_2 + \text{Energy} \quad \text{Equation 2}$$

In some formations, such as gas reservoirs, a major reactant in the partial oxidation reaction is methane ($CH_4$). In this partial oxidation reaction, $CH_4$ reacts with $O_2$ to produce $H_2$, CO, and heat energy as shown in Equation 3. However, in a full oxidation reaction, $CH_4$ reacts with $O_2$ to produce $H_2$, $CO_2$ and heat energy as shown in Equation 4. The heat energy produced by the reaction shown in Equation 4 is greater than the energy produced by the reaction shown in Equation 3.

$$CH_4 + \tfrac{1}{2}O_2 \rightarrow CO + 2H_2 + \text{Energy} \quad \text{Equation 3}$$

$$CH_4 + H_2O \leftrightarrow CO + 3H_2 + \text{Energy} \quad \text{Equation 4}$$

In one or more embodiments, a catalyst may be injected into the formation. The catalyst may be selected from a group consisting of Fe, Cu, Cr, and combinations thereof. The catalyst may accelerate the reaction in Equation 4 to result in a higher production of hydrogen. Catalyst examples may include $Fe_2O_3$, $FeCrO_4$, $CuZnO$, or $Cr_2O_3$. The catalyst may be bimetallic. Bimetallic catalysts may include $CuZnO/Al_2O_3$. The choice of catalyst may vary depending on the temperature and pressure of the formation. $Fe_2O_3$ and $FeCrO_4$ may be used for low temperature reactions in temperatures ranging from 200° C. to 400° C. CuZnO and $Cr_2O_3$ may be used for high temperature reactions in temperatures equal to or greater than 400° C. The choice of catalyst may also depend on the composition of $CH_4$, $O_2$, and $CO_2$ in the formation and the desired reaction rate.

According to one or more embodiments, the stimulation method 100 includes separating hydrogen with a membrane. The membrane may be a polymer membrane, a polymeric blend membrane, a metal-organic framework (MOF), or a ceramic membrane. The membrane may be configured to separate hydrogen from carbon dioxide, other gases and light hydrocarbons and pass the hydrogen to a hydrogen storage container. In other embodiments, the membrane may be configured to separate carbon dioxide from carbon monoxide and hydrogen. The choice of membrane may vary depending on formation conditions. Polymer membranes may be used based on a moderate permeability and selectivity for hydrogen. Polymeric blend membranes may be used due to the blend of polymers having enhanced hydrogen separation performance. MOFs may be used based on a selectivity for hydrogen fabricated into the membranes. Ceramic materials may be used based on the ability to separate hydrogen at high temperatures and their mechanical strength. Membrane examples may include polyethylene membranes, polyetherimide membranes, polysulfone membranes, polyamide membranes, and combinations thereof.

According to one or more embodiments, the stimulation method 100 includes diverting $CO_2$ with a gelling agent. The gelling agent may include polymer gels, in-situ gelling agents, microgels, or particulate diverting agents. The polymer gel may divert the injected $CO_2$ to a target zone by reducing the mobility. The in-situ gelling agent and particulate diverting agents may divert the injected $CO_2$ to a target zone by plugging high-permeability zones. The microgel may divert the injected $CO_2$ to a target zone by selectively swelling in response to $CO_2$. Gelling agent examples may include hydroxypropyl guar, xanthan gum, viscoelastic surfactants, thermos-responsive polymers, crosslinked polymers, colloidal particles, fibers, granules, or coated materials. The choice of gelling agent may vary depending on formation conditions.

The stimulation method 100 is concluded in step 116. Use of the wellbore as a production wellbore, an injection wellbore, or other use of the wellbore for hydrocarbon production, such as for the production of oil, natural gas, or combinations thereof, may then resume.

Figure 2:
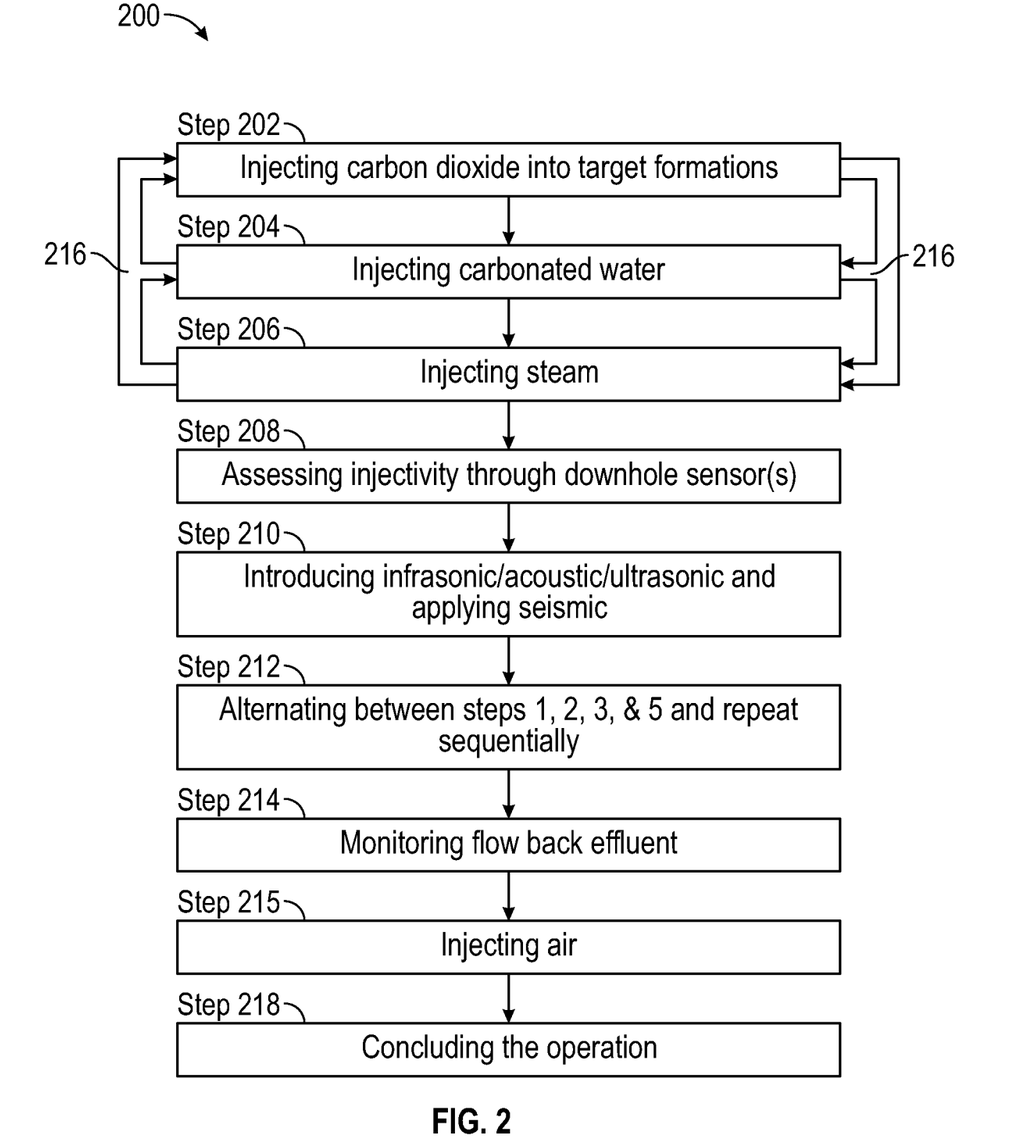

Referring now to FIG. 2, a flowchart illustrating steps of a method for stimulating a reservoir according to embodiments herein is illustrated.

Stimulation method 200 includes a first step 202 injecting carbon dioxide into the target formation. As noted above, the carbon dioxide may be supercritical, subcritical, and may be gaseous, liquid, or supercritical. The carbon dioxide injection may be performed for a period of time, such as 30 minutes or one hour to five hours. Carbon dioxide may be injected, for example, at rates in a range from 100 kg/h to 1000 kg/h, although such ranges may vary depending upon the type and size of the target formation.

Following injection of carbon dioxide, method 200 includes step 204 injecting carbonated water into the formation. Carbonated fluids, as described above, may be generated in situ via dissolution of carbon dioxide in water downhole prior to injection, or may be generated using a surface facility and injected downhole or may be generated in situ within the wellbore. In some embodiments, step 204 includes injecting hot carbonated water. In other embodiments, step 204 includes injecting cold carbonated water. The carbonated water injection may be performed for a period of time, such as 30 minutes or one hour to five hours. Carbonated water may be injected, for example, at rates in a range from 100 kg/h to 1000 kg/h, although such ranges may vary depending upon the type and size of the target formation.

Following injection of carbonated fluids, method 200 includes step 206 injecting steam into the formation. Steam may be generated using a surface facility and injected downhole or may be generated in situ within the wellbore. The steam injection may be performed for a period of time, such as 30 minutes or one hour to five hours. Steam may be injected, for example, at rates in a range from 100 kg/h to 1000 kg/h, although such ranges may vary depending upon the type and size of the target formation.

In step 208, the method includes assessing the injectivity. Extent of completion of reactions and other properties of the reservoir or the injected or produced fluids may be measured with various downhole sensors, including thermal sensors, ultrasonic sensors, and others to assess the changes to the near wellbore area resulting from the sequential injection of carbon dioxide and steam. While listed as a "step" in the present flowchart, assessing the injectivity may be performed continuously during the extent of the stimulation process, concurrent with other steps of the method.

In step 210, the method includes stimulating the target formation by introducing infrasonic waves, acoustic waves, ultrasonic waves, or microwaves. As noted above, such stimulation may enhance transport within and/or reactivity of the injected fluids with the formation. Step 108 also includes applying seismic measurements and analyses to assess changes in formation flow characteristics. Stimulation may be performed, for example, for a period of time in a range from 30 minutes or 1 hour to 5 hours.

In step 212, the steps of injecting carbon dioxide, carbonated water, and steam, and stimulation may be repeated sequentially. For example, two, three, or four cycles of carbon dioxide injection, carbonated water injection steam injection, and stimulation may be performed. The steps may be performed manually, such as over discrete time intervals, or may be automated, where the automated sequencing may be performed utilizing one or more sensors disposed within the wellbore, where the sequence steps may be automatically transitioned based upon reaction completion, reservoir temperature, or other factors.

Following completion of the sequential injection of carbon dioxide, carbonated water, and steam, well flowback is initiated in step 214, and the flow back effluent is monitored. Monitoring of the flow back effluent may be performed via one or more manual or automated sensors disposed within the wellbore, and may monitor acidity, composition, temperature, rate, or other aspects of the flow back effluent. In other embodiments, monitoring of the flowback may be performed or measured at a surface location based upon produced fluids received at the surface.

Arrows 216, while not a true "step" in the process, simply provides a reminder that, as described above, the carbon dioxide, carbonated water, and steam injection may be performed in any order. For example, step 202 may be followed by or preceded by step 204 or 206. Further, when alternating between steps 202, 204, 206, and 210, a second or subsequent sequence of injections may swap the order of steam injection, carbonated water injection, and carbon dioxide injection for that particular cycle.

When desired injectivity and flow back are achieved, step 215 of air injection may be performed. As noted above, air injection may be pressurized depending on the type of formation. According to one or more embodiments high pressure air injection (HPAI) is injected into the formation. The pressurized air in HPAI contains oxygen that reacts with some of the hydrocarbons in the formation to produce carbon dioxide. HPAI may be useful to increase production for light oils instead of using light air injection (LAI). HPAI may be performed at pressures greater than 800 psig. The air may be gaseous and factors such as the gas flow rate, time of flowing gas, and amount of gas needed may depend on the environmental variables such as temperature and pressure, and fluid properties of the formation. The air injection may be 50% to 90% air by volume. The air may comprise atmospheric air, air having dilute oxygen, or oxygen-enriched air. According to one or more embodiments, heated air (hot air) is introduced into the formation. The temperature of the heated air may be in a range from 400° C. to 600° C.

In one or more embodiments, air injection may result in the reactions previously described in method 100 as Equations 1-4. A catalyst may be added as previously described in method 100. The catalyst may accelerate the reaction in Equation 4 to result in a higher production of hydrogen. The catalysts in method 200 have several aspects that are similar to and appreciated in the catalysts of method 100, as previously described.

According to one or more embodiments, the stimulation method 200 includes separating hydrogen with a membrane. The membrane may be configured to separate hydrogen from carbon dioxide, other gases and light hydrocarbons and pass the hydrogen to a hydrogen storage container. In other embodiments, the membrane may be configured to separate carbon dioxide from carbon monoxide and hydrogen. The membranes in method 200 have several aspects that are similar to and appreciated in the membranes of method 100, as previously described.

According to one or more embodiments, the stimulation method 200 includes a diverting $CO_2$ with a gelling agent. The gelling agent may be used to reduce the mobility of the injected $CO_2$ and divert it to a target zone. The gelling agents in method 200 have several aspects that are similar to and appreciated in the gelling agents of method 100, as previously described.

The stimulation method 200 is concluded in step 218. Use of the wellbore as a production wellbore, an injection wellbore, or other use of the wellbore for hydrocarbon production, such as for the production of oil, natural gas, or combinations thereof, may then resume.

Figure 3:
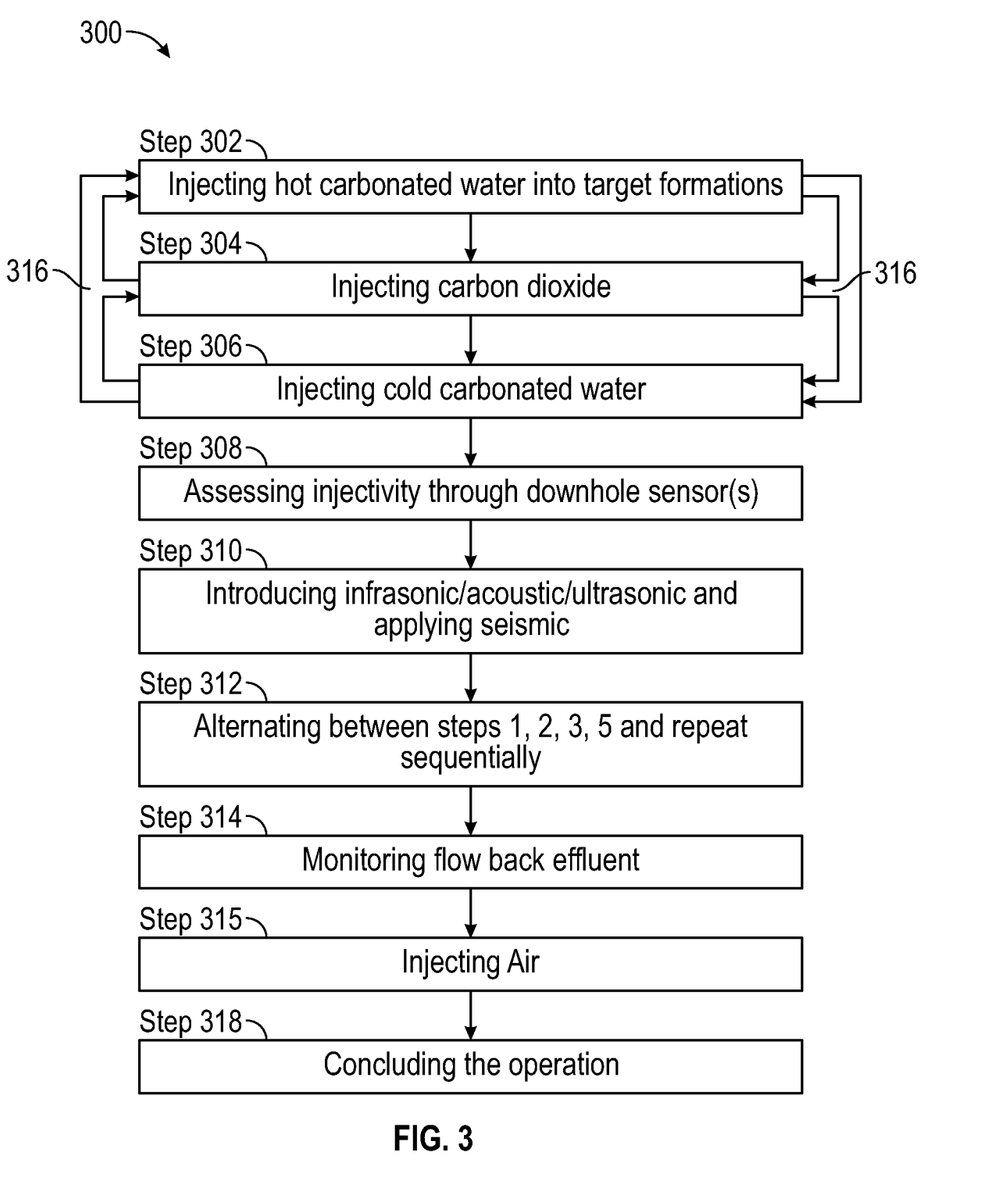

Referring now to FIG. 3, a flowchart illustrating steps of a method for stimulating a reservoir according to embodiments herein is illustrated.

Stimulation method 300 includes a first step 302 injecting hot carbonated water into the formation. Hot carbonated fluids, as described above, may be generated in situ via dissolution of carbon dioxide in water downhole prior to injection, or may be generated using a surface facility and injected downhole. The hot carbonated water injection may be performed for a period of time, such as 30 minutes or one hour to five hours. Hot carbonated water may be injected, for example, at rates in a range from 100 kg/h to 1000 kg/h, although such ranges may vary depending upon the type and size of the target formation.

Following injection of hot carbonated water, method 300 includes step 304 injecting carbon dioxide into the target formation. As noted above, the carbon dioxide may be supercritical, subcritical, and may be gaseous, liquid, or supercritical. The carbon dioxide injection may be performed for a period of time, such as 30 minutes or one hour to five hours. Carbon dioxide may be injected, for example, at rates in a range from 100 kg/h to 1000 kg/h, although such ranges may vary depending upon the type and size of the target formation.

Following injection of carbon dioxide, method 300 includes step 306 injecting cold carbonated water into the formation. Cold carbonated fluids, as described above, may be generated in situ via dissolution of carbon dioxide in water downhole prior to injection, or may be generated using a surface facility and injected downhole. The cold carbonated water injection may be performed for a period of time, such as 30 minutes or one hour to five hours. Cold carbonated water may be injected, for example, at rates in a range from 100 kg/h to 1000 kg/h, although such ranges may vary depending upon the type and size of the target formation.

Alternating between hot and cold carbonated water may target different stimulations. Hot carbonated water may improve hydrocarbon mobility due to the reduction of the oil phase viscosity within the formation. Cold carbonated water may improve the solubility of $CO_2$ in the formation, which may result in more $CO_2$ trapping and sequestration.

In step 308, the method includes assessing the injectivity. Extent of completion of reactions and other properties of the reservoir or the injected or produced fluids may be measured with various downhole sensors, including thermal sensors, ultrasonic sensors, and others to assess the changes to the near wellbore area resulting from the sequential injection of carbon dioxide and steam. While listed as a "step" in the present flowchart, assessing the injectivity may be performed continuously during the extent of the stimulation process, concurrent with other steps of the method.

In step 310, the method includes stimulating the target formation by introducing infrasonic waves, acoustic waves, ultrasonic waves, or microwaves. As noted above, such stimulation may enhance transport within and/or reactivity of the injected fluids with the formation. Step 108 also includes applying seismic measurements and analyses to assess changes in formation flow characteristics. Stimulation may be performed, for example, for a period of time in a range from 30 minutes or 1 hour to 5 hours.

In step 312, the steps of injecting hot carbonated water, carbon dioxide, and cold carbonated water, and stimulation may be repeated sequentially. For example, two, three, or four cycles of hot carbonated water injection, carbon dioxide injection, cold carbonated water injection, and stimulation may be performed. The steps may be performed manually, such as over discrete time intervals, or may be automated, where the automated sequencing may be performed utilizing one or more sensors disposed within the wellbore, where the sequence steps may be automatically transitioned based upon reaction completion, reservoir temperature, or other factors.

Following completion of the sequential injection of hot carbonated water, carbon dioxide, and cold carbonated water, well flowback is initiated in step 314, and the flow back effluent is monitored. Monitoring of the flow back effluent may be performed via one or more manual or automated sensors disposed within the wellbore, and may monitor acidity, composition, temperature, rate, or other aspects of the flow back effluent. In other embodiments, monitoring of the flowback may be performed or measured at a surface location based upon produced fluids received at the surface.

Arrows 316, while not a true "step" in the process, simply provides a reminder that, as described above, the hot carbonated water, carbon dioxide, and cold carbonated water injection may be performed in any order. For example, step 302 may be followed by or preceded by step 304 or 306.

Further, when alternating between steps 302, 304, 306, and 310, a second or subsequent sequence of injections may swap the order of steam injection, carbonated water injection, and carbon dioxide injection for that particular cycle.

When desired injectivity and flow back are achieved, step 315 of air injection may be performed. As noted above, air injection may be pressurized depending on the type of formation. According to one or more embodiments high pressure air injection (HPAI) is injected into the formation. The pressurized air in HPAI contains oxygen that reacts with some of the hydrocarbons in the formation to produce carbon dioxide. HPAI may be useful to increase production for light oils instead of using light air injection (LAI). HPAI may be performed at pressures greater than 800 psig. The air may be gaseous and factors such as the gas flow rate, time of flowing gas, and amount of gas needed may depend on the environmental variables such as temperature and pressure, and fluid properties of the formation. The air injection may be 50% to 90% air by volume. The air may comprise atmospheric air, air having dilute oxygen, or oxygen-enriched air. According to one or more embodiments, heated air (hot air) is introduced into the formation. The temperature of the heated air may be in a range from 400° C. to 600° C.

In one or more embodiments, air injection may result in the reactions as previously described in method 100 as Equations 1-4. A catalyst may be added as previously described in method 100. The catalyst may accelerate the reaction in Equation 4 to result in a higher production of hydrogen. The catalysts in method 300 have several aspects that are similar to and appreciated in the catalysts of method 100, as previously described.

According to one or more embodiments, the stimulation method 300 includes separating hydrogen with a membrane. The membrane may be configured to separate hydrogen from carbon dioxide, other gases and light hydrocarbons and pass the hydrogen to a hydrogen storage container. In other embodiments, the membrane may be configured to separate carbon dioxide from carbon monoxide and hydrogen. The membranes in method 300 have several aspects that are similar to and appreciated in the membranes of method 100, as previously described.

According to one or more embodiments, the stimulation method 300 includes a diverting $CO_2$ with a gelling agent. The gelling agent may be used to reduce the mobility of the injected $CO_2$ and divert it to a target zone. The gelling agents in method 300 have several aspects that are similar to and appreciated in the gelling agents of method 100, as previously described.

The stimulation method 300 is concluded in step 318. Use of the wellbore as a production wellbore, an injection wellbore, or other use of the wellbore for hydrocarbon production, such as for the production of oil, natural gas, or combinations thereof, may then resume.

As described for each of FIGS. 1-3, treating the target zone with steam, carbon dioxide, hot carbonated fluids, or cold carbonated fluids, along with stimulation in the sequential processes herein may reduce the viscosity of hydrocarbons and other fluids within the reservoir due to added heat, and may produce microfractures or other changes in reservoir characteristics resulting from reactions with $H^+$ or $CO_3^{2-}$ in order to increase hydrocarbon production.

As described above, the treatment of the target zone with hot carbonated fluids may improve the hydrocarbon production, while treatment with cold carbonated fluids may improve the solubility of carbon dioxide, which may result in more carbon dioxide trapping and sequestration. The treatment with hot or cold carbonated fluids may then result in overall increased well productivity and less carbon dioxide production during flow back.

As described above, embodiments herein utilize sequential carbon dioxide, steam, and carbonated water injection to enhance oil mobility and oil recovery from a formation. In some embodiments, multiple cycles of the sequential injections and stimulation may be used to result in enhanced recovery of hydrocarbons from reservoirs. Additionally, embodiments herein and as described above describe fracking, treatment or productivity enhancement techniques that will minimize $CO_2$ flow back during cleanout operations and enhance the process.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for stimulating a reservoir, the method comprising:
    providing a well traversing a subsurface into a reservoir containing hydrocarbons;
    introducing carbon dioxide and steam into the reservoir via the well;
    stimulating the reservoir using one or more of infrasonic, acoustic, and ultrasonic stimulation;
    applying seismic analyses to determine changes in flow characteristics of the reservoir in response to introducing carbon dioxide and steam, and stimulating the reservoir;
    monitoring a flow back effluent via one or more sensors located in the well to determine one or more properties of the flow back effluent; and
    repeating introducing carbon dioxide and steam, stimulating, and applying seismic until a desired property of the flow back effluent is achieved.

2. The method of claim 1, wherein introducing carbon dioxide and steam into the reservoir comprises one of:
    injecting carbon dioxide into the reservoir via the well then injecting steam into the reservoir via the well;
    injecting steam into the reservoir via the well then injecting carbon dioxide into the reservoir via the well; or
    co-injecting steam and carbon dioxide into the reservoir via the well.

3. The method of claim 1, wherein introducing carbon dioxide and steam further comprises introducing hot carbonated water into the reservoir via the well.

4. The method of claim 3, wherein introducing comprises:
    injecting carbon dioxide into the reservoir via the well;
    injecting hot carbonated water into the reservoir via the well; then
    injecting steam into the reservoir via the well.

5. The method of claim 1, wherein the method further comprises injecting air into the reservoir via the well.

6. The method of claim 5, wherein injecting air comprises injecting hot air into the reservoir via the well.

7. The method of claim 5, wherein injected air reacts with hydrocarbons within the reservoir to form hydrogen gas, the method further comprising recovering the hydrogen gas.

8. The method of claim 7, wherein the hydrogen gas is recovered by separating the hydrogen from the hydrocarbons via a membrane and producing the hydrogen to a surface via the well.

9. A method for stimulating a reservoir, the method comprising:
    providing a well traversing a subsurface into a reservoir containing hydrocarbons;
    introducing hot carbonated water, carbon dioxide, and cold carbonated water into the reservoir via the well;
    stimulating the reservoir using one or more of infrasonic, acoustic, and ultrasonic stimulation;
    applying seismic analyses to determine changes in flow characteristics of the reservoir in response to introducing hot carbonated water, carbon dioxide and cold carbonated water, and stimulating the reservoir;
    monitoring a flow back effluent via one or more sensors located in the well to determine one or more properties of the flow back effluent; and
    repeating sequentially introducing hot carbonated water, carbon dioxide and cold carbonated water, stimulating, and applying seismic until a desired property of the flow back effluent is achieved.

10. The method of claim 9, wherein introducing hot carbonated water, carbon dioxide, and cold carbonated water into the reservoir comprises injecting hot carbonated water into the reservoir via the well, injecting carbon dioxide into the reservoir via the well, then injecting cold carbonated water into the reservoir via the well.

11. The method of claim 9, wherein introducing hot carbonated water, carbon dioxide, and cold carbonated water into the reservoir comprises injecting cold carbonated water into the reservoir via the well, injecting carbon dioxide into the reservoir via the well, then injecting hot carbonated water into the reservoir via the well.

12. The method of claim 9, wherein introducing hot carbonated water, carbon dioxide, and cold carbonated water into the reservoir comprises co-injecting hot carbonated water and carbon dioxide into the reservoir, then injecting cold carbonated water into the reservoir.

13. The method of claim 9, wherein the method further comprises injecting air into the reservoir via the well.

14. The method of claim 13, wherein injecting air comprises injecting hot air into the reservoir via the well.

15. The method of claim 13, wherein injected air reacts with hydrocarbons within the reservoir to form hydrogen gas, the method further comprising recovering the hydrogen gas.

16. The method of claim 15, wherein the hydrogen gas is recovered by separating the hydrogen from the hydrocarbons via a membrane and producing the hydrogen to a surface via the well.

* * * * *